Aug. 28, 1962  F. S. FARLEY  3,050,779
PLASTIC PLASTICIZING HEATER
Filed Aug. 8, 1960  5 Sheets-Sheet 1

INVENTOR.
FRANCIS S. FARLEY
BY
Kenyon & Kenyon
ATTORNEYS

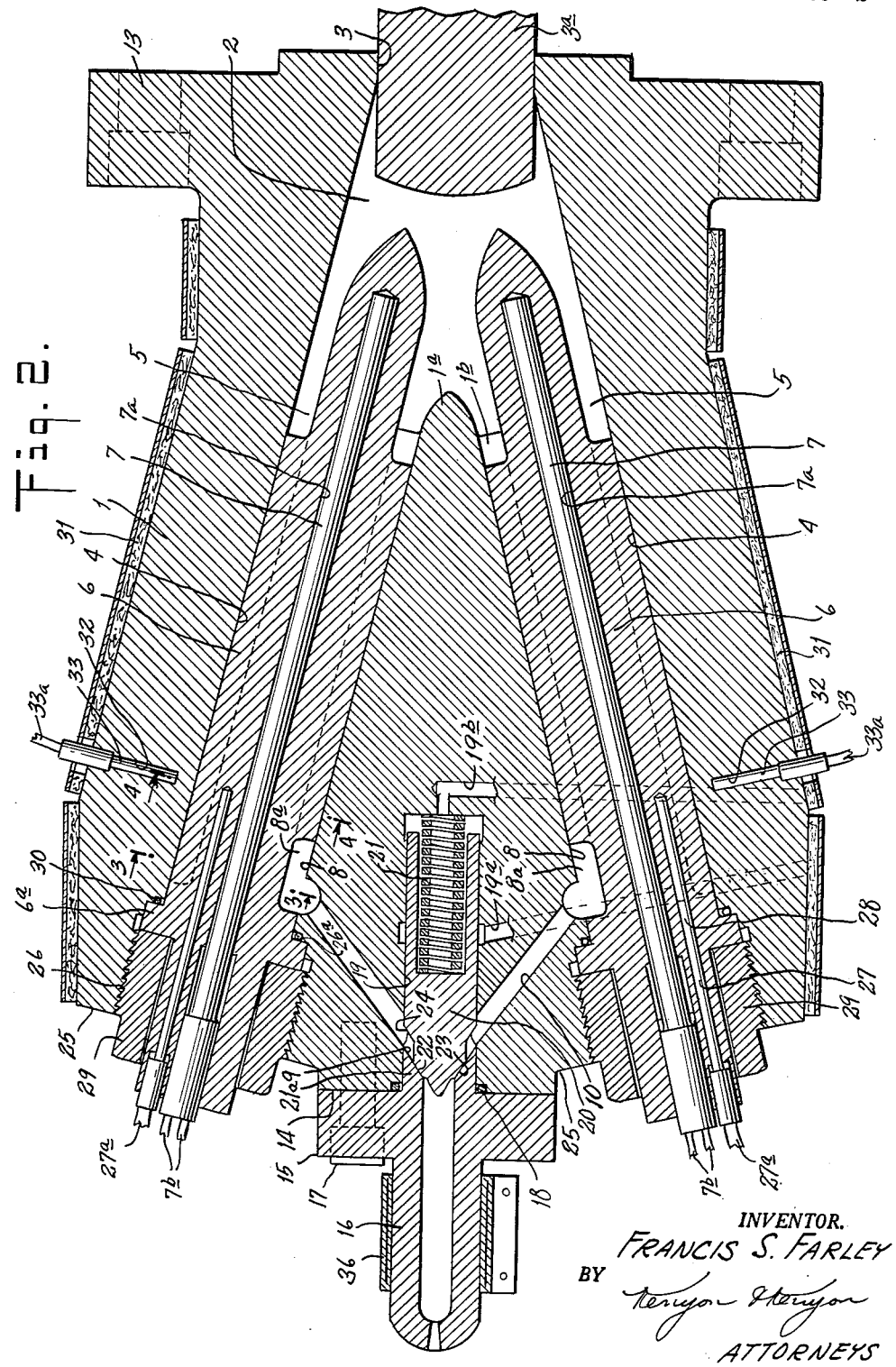

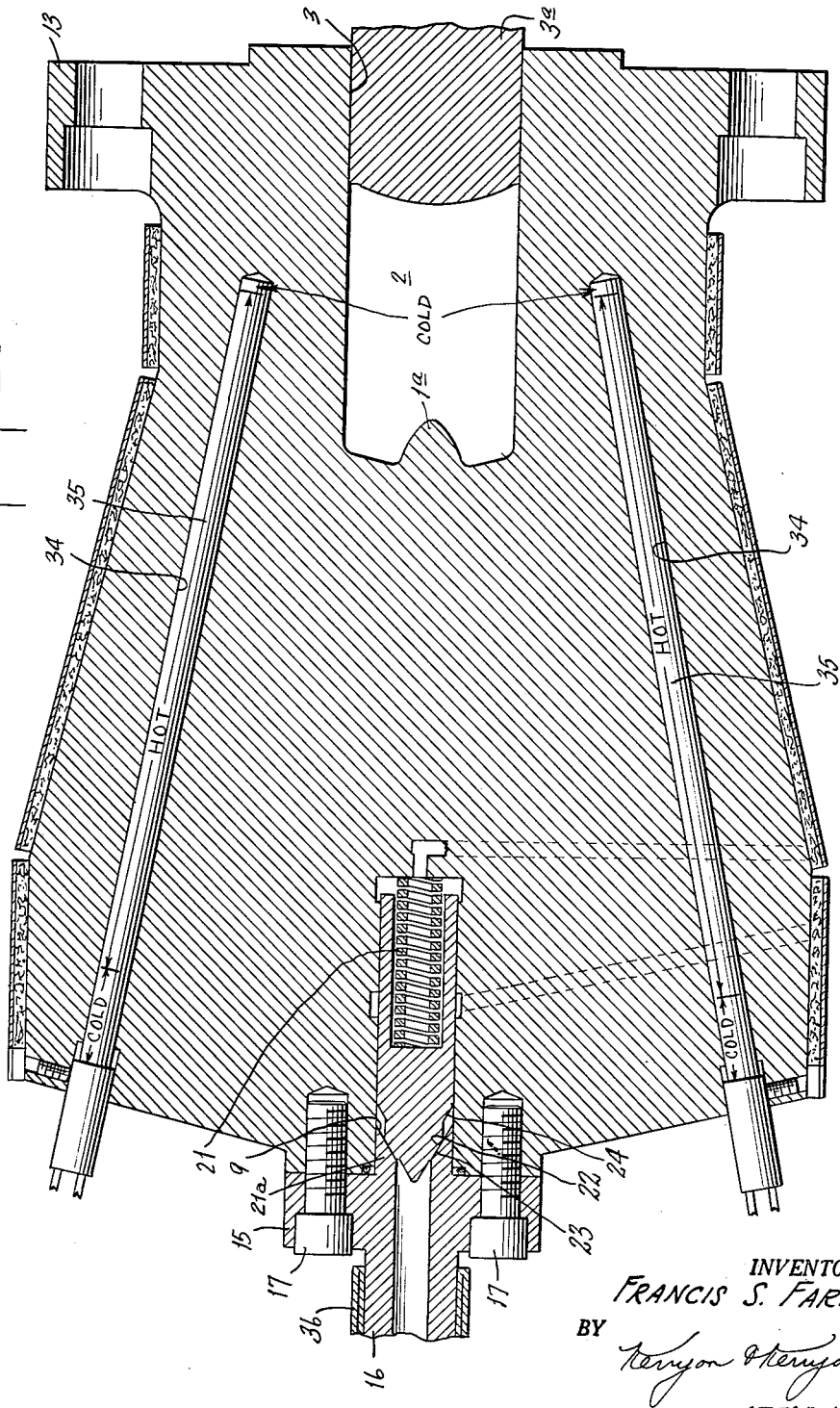

Aug. 28, 1962 F. S. FARLEY 3,050,779
PLASTIC PLASTICIZING HEATER
Filed Aug. 8, 1960 5 Sheets-Sheet 4
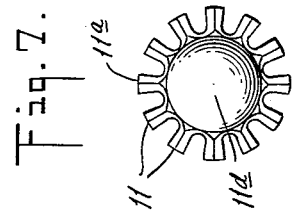
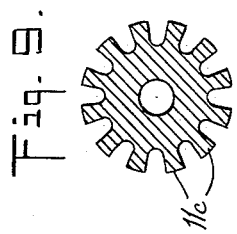
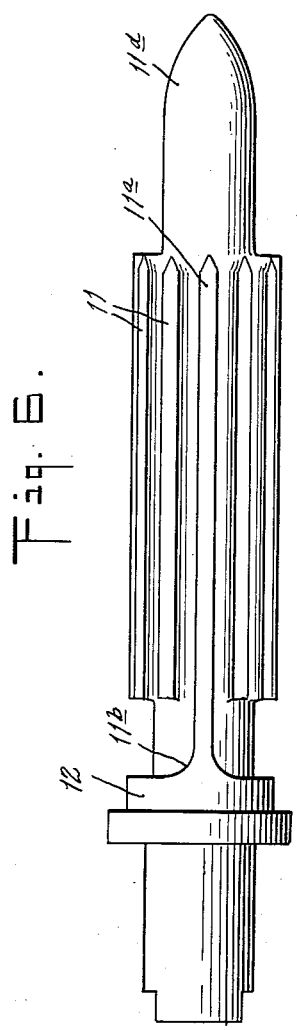
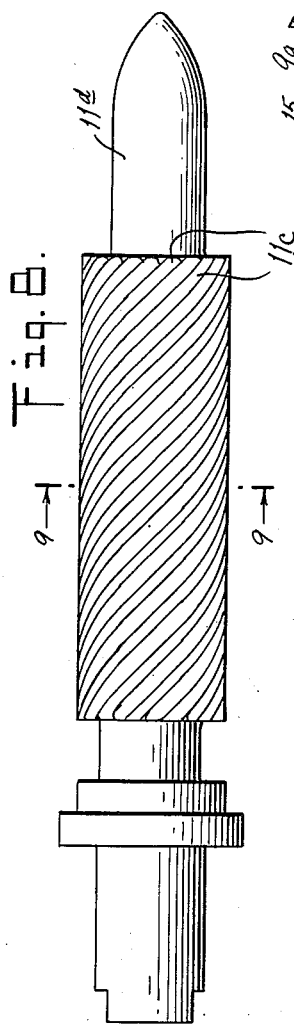
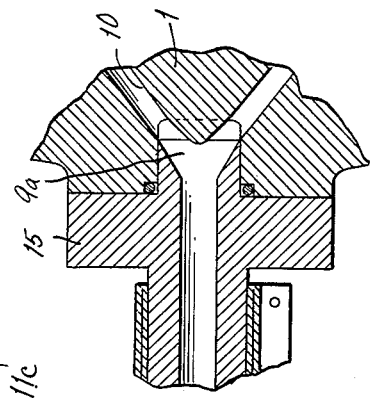
INVENTOR.
FRANCIS S. FARLEY
BY
ATTORNEYS

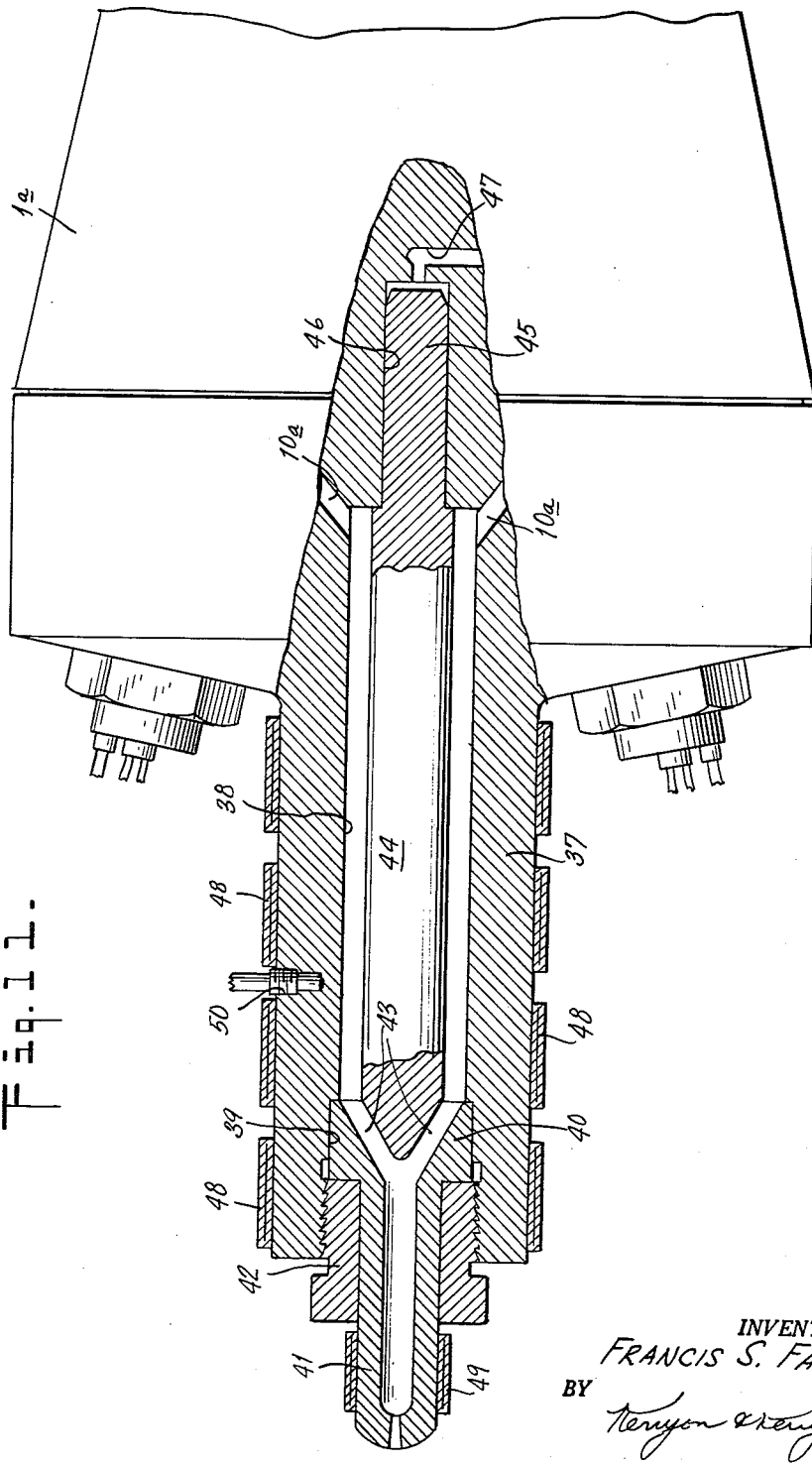

United States Patent Office 3,050,779
Patented Aug. 28, 1962

3,050,779
PLASTIC PLASTICIZING HEATER
Francis S. Farley, 564 1st St., Westfield, N.J.
Filed Aug. 8, 1960, Ser. No. 48,018
4 Claims. (Cl. 18—30)

This invention relates to plastic plasticizing heaters such as are used with plastic injection molding machines.

A plastic injection molding machine typically includes a cylinder containing a reciprocative plunger and having a loading port through which a granular plastic is charged into the cylinder when the plunger is retracted. When the plunger is advanced, usually by a hydraulic ram, the granular plastic is forced forwardly through the cylinder. A plastic plasticizing heater is attached to the forward end of this cylinder and the granular plastic is forced through this heater for the purpose of heating the granular plastic to plasticize it, the plastics used softening and becoming fluid when heated. An injection molding nozzle is mounted on the forward end of this heater so that when the tip of this nozzle is pressed against the sprue of a die, the plasticized plastic is injected into the latter and then cooled so as to produce the desired solid product.

The plastic material used in non-metallic and inherently a poor heat conductor, and the pressure required to fill the die properly is very high. Therefore, this art has for a long time been confronted with the problem of constructing a heater capable of plasticizing the initially granular plastic without involving objectionable construction, maintenance or operation problems.

The usual heater is called a heating cylinder because it comprises an externally heated cylinder having the same diameter as the cylinder used to charge it with the granular plastic as described previously, the latter ordinarily being called the injection or shooting cylinder and its plunger being correspondingly named. Because such a heating cylinder must cope with the problem of the poor heat conductivity of plastic materials, it is usually provided with a torpedo against which the plastic is driven by the shooting plunger and spread to an annular form within the heating cylinder for the purpose of permitting the latter to with practical rapidity drive its heat into the plastic.

Ordinarily the use of the torpedo results in a plastic flow space of less cross-sectional area than that of the shooting cylinder. This requires great pressure to drive the granular plastic into the annular space formed between the torpedo and the heating cylinder. This difficulty has necessitated the use of undesirably long heating cylinders provided with heaters of high capacity located to heat the heating cylinder in front of the torpedo for the purpose of at least partially plasticizing the plastic before it enters the annular space between the torpedo and the cylinder. This practice involves inherently the risk of overheating or burning the plastic at this highly heated zone. In addition changes from one type of plastic to another involves great waste as the newly used plastic purges the large amount of old plastic remaining. Even so it does not overcome the problem of losing a great amount of the shooting plunger's pressure through friction as the plastic drives over the front of the torpedo into the restricted annular space required to get the plastic fully plasticized before it reaches the injection nozzle.

Prior art efforts to overcome the above and other problems in this art have not been satisfactorily successful.

One expedient has been to enlarge the internal diameter of the heating cylinder relative to that of the shooting cylinder. This is unsatisfactory because the enlarged piston area presented to the plastic under the hydraulic pressure of the relatively smaller shooting plunger, demands that the cylinder be made with very massive walls to handle the amplified hydraulic pressure. Both servicing and repair considerations make it advisable to mount the torpedo by releasable means in the heating cylinder, and here again the exaggerated piston area makes it extremely difficult to design a tight-joint which is free from leakage and which can be released when desired.

The problems under discussion have led to many fancy design proposals, which in most instances have inherent defects sufficient to prevent their use commercially.

One special construction that has been used commercially comprises the making of the heating cylinder in three sections with the middle section drilled to provide an annular series of holes and with the central portion of this middle section formed to provide the torpedo. Here the hydraulic pressures have introduced such severe leakage problems, as to result in the extreme expedient of welding the three sections together.

Such prior art heaters have been externally heated, among other reasons, because of the problem of rendering the granular plastic substantially plasticized before the shooting plunger must drive the plastic over the torpedo. This has necessitated the heating of the plastic in the zone deliberately provided in front of the torpedo for this purpose. In some instances the torpedo itself has been heated but only with a low heating capacity cartridge providing auxiliary heat as contrasted to primary heating. The main heating requirement has been to blast heat into the plastic prior to its reaching the torpedo so as to plasticize the plastic sufficiently to permit it to be driven over the torpedo. The following action is to equalize the heat and effect final plasticizing.

Because of the need to externally heat the heating cylinder, it has been heretofore generally unsatisfactory to provide the torpedo with ribs or other projections which contact the heating cylinder's walls through an extent sufficient to interconnect the torpedo and the heating cylinder wall in an effectively thermally conductive manner. Since most of the heat is applied externally to the cylinder it is hotter than the torpedo with the result that thermal expansion produces a separation between the torpedo projections and the cylinder wall, keeping in mind that these parts must form a sliding fit when both are cold, to permit servicing of the equipment. Therefore, not much of the externally applied heat goes into the torpedo.

One of the objects of the present invention is to provide a plastic plasticizing heater which will overcome the problems and be free from the troubles that have been outlined above. More specifically, an object is to provide an injection molding machine plastic plasticizing heater which will transmit an unusually large percentage of the shooting plunger's pressure to properly plasticized plastic at the injection nozzle, while reducing the heating cost involved and while providing a practical construction permitting its commercial manufacture, maintenance and servicing. Other objects may be inferred from the following description:

Briefly summarized, a plastic plasticizing heater constructed in accordance with the present invention includes a body forming a platsic receiving chamber and an entrance through which unplasticized plastic may be charged under pressure. This chamber functions as a manifold and not as a high heat zone. Normally this entrance is registered with the shooting cylinder of an injection molding machine so that the shooting plunger charges the plastic under pressure. This body forms a plurality of heating chambers having inlet ends wide open to the chamber charged with the plastic under pressure so that this plastic flows from the latter in the form of divided flows through the cylinders. Thus when four cylinders are used there are four divided flows. This new heater includes torpedoes positioned in the cylinders to spread the divided flows therein and the heating cylinders have means for heating the spread plastic so as to plasticize this initially granular material. The various heating cylinders have outlet ends and the body forms a discharge passage, ordinarily connected with the injection nozzle, and ducts which connect these outlet ends with this discharge passage so that the plasticized divided flows rejoin for discharge through the discharge passage and the injection nozzle ordinarily attached to the latter.

With the above construction the multiple heating cylinders and their contained torpedoes are proportioned so that the total cross-sectional area of the flow space defined collectively by all of the torpedoes and cylinders is at least approximately and preferably equally as large as the cross-sectional area of the above mentioned chamber's entrance which normally corresponds to the cross-sectional area of the shooting cylinder and its plunger. This cross-sectional area relationship should prevail with respect to the torpedoes and cylinders throughout at least substantial lengths of the same extending from these cylinders' inlet ends.

With the above construction the still granular plastic can travel freely without flow restriction and under substantially the full pressure of the shooting plunger. It does not encounter the flow restriction inherent to prior art constructions designed to avoid excessive hydraulic pressures resulting from the expedient of enlarging the heating cylinder. Furthermore, while providing the same free flowing characteristic inherent to a heating cylinder which is greatly enlarged with respect to the shooting cylinder and its plunger, this new construction keeps the hydraulic pressure which must be borne by separable parts, such as the torpedo retaining means and the like, down to pressures which are actually less than that exerted by the shooting plunger. The body in which the cylinders are formed may be an integral piece of metal of great strength without interfering with the removability of the torpedoes for cleaning and servicing.

Furthermore, and this is a matter of considerable importance, the still granular plastic may be driven without substantial flow resistance over the torpedoes. This makes it practical to place large capacity heating cartridges in the torpedoes and thus internally provide all or a majority of the heating required to plasticize the granular plastic, as contrasted to the prior art external heating with all of its troubles. In this fashion the divided flows of plastic are each gradually heated so as to gradually reach an adequately plastic condition and with this condition occurring locally in the outlet ends of the heating cylinders.

The best mode contemplated at the present time for carrying out this invention is illustrated by the accompanying drawings in which:

FIG. 2 is a longitudinal section taken on the line 2—2 in FIG. 1;

Figure 1:
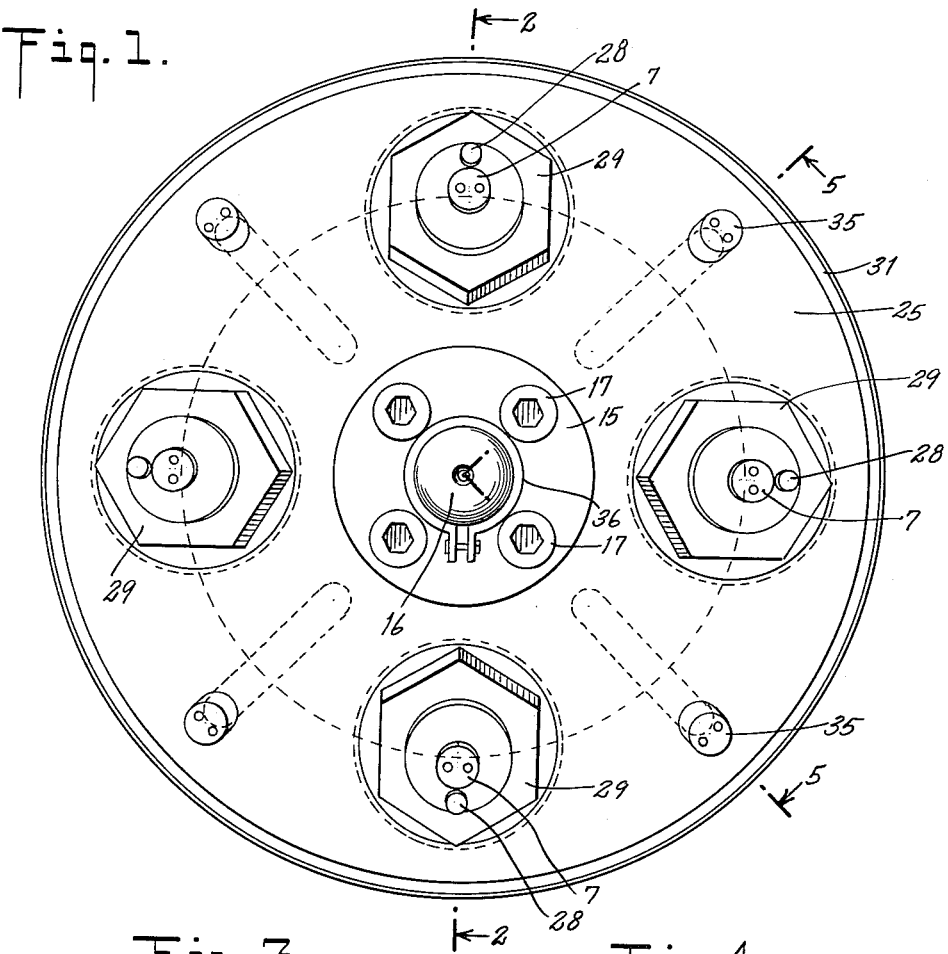
FIG. 1 is a front view of a plastic plasticizing heater incorporating the principles of the invention.
Figure 3:
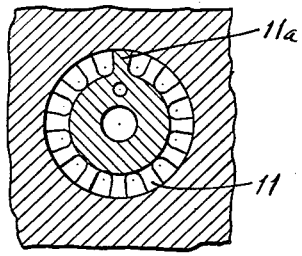
FIG. 3 is a cross section showing a segment of the heater taken on the line 3—3 in FIG. 2.
Figure 4:
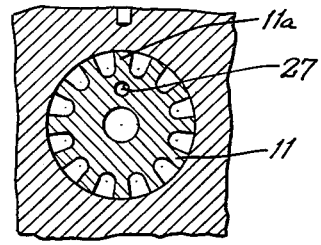

FIG. 4 corresponds to FIG. 3 excepting that it is taken on the line 4—4 in FIG. 2;

FIG. 5 is a longitudinal section of the heater taken on the line 5—5 in FIG. 1;

FIG. 6 is a side view of one form of torpedo used by the heater;

FIG. 7 is an end view of the torpedo shown by FIG. 6;

FIG. 8 is a side view showing another form of torpedo used by the heater;

FIG. 9 is a cross section of the second form of torpedo and is taken on the line 9—9 in FIG. 8;

FIG. 10 is a segment taken from FIG. 2, this latter figure showing a valve to prevent dribbling and FIG. 10 showing the appearance when this valve is eliminated; and FIG. 11 shows the discharge end portion of the heater in elevation and in longitudinal cross section shows how the heater is modified to provide a second example of the invention.

These drawings show the solid metal body 1 forming the plastic receiving or manifold chamber 2, having the entrance 3 through which the unplasticized plastic in granular form may be charged under the pressure of an injection molding machine's shooting plunger 3a. Although not illustrated it is to be understood that this shooting plunger works in the injection molding machine's shooting cylinder which is provided with means for loading it with the plastic granules so that they are pushed forwardly by the plunger 3a. Such a machine would have suitable means for applying high pressure to the plunger 3a during its advance stroke. The plunger is illustrated at the limit of its forward stroke in this instance and as projecting into the chamber 2, each new charge of introduced plastic flushing the chamber 2 to avoid plastic entrapment of a harmful nature around the plunger 3a.

The various heating cylinders, four being used in this instance, have inlet ends 5 completely open to the chamber 2, so that the introduced plastic flows from the latter in the form of the divided flows through the various cylinders 4. Thus the chamber 2 acts as a manifold. Each cylinder contains a torpedo 6 positioned in it to spread the divided flow of plastic in that cylinder and each torpedo contains an electrical resistance heating cartridge 7 which provides a means for heating the flow of plastic spread by the torpedo. Each cylinder has an outlet end 8 and the body 1 forms a discharge passage 9 and ducts 10 which connect all of the cylinders' outlet ends 8 with this discharge passage 9. Thus the various divided flows rejoin for discharge through the passage 9.

The diameters of the various cylinders 4 and the design of the torpedoes 6 are such that the total cross-sectional area of the flow space defined collectively by all of the torpedoes and cylinders as a group is as large as the cross-sectional area of the entrance 3. Therefore, the plastic, whether or not it is plasticized, may flow through the various cylinders without any choked effect and without a velocity increase. In this instance this relation prevails throughout the full lengths of the cylinders 4. It is of maximum importance throughout the initial travelling paths where the granular plastic is not yet plasticized. Design considerations may result in departures from an absolutely equal relation to conditions where the flow paths over the torpedoes within the cylinders collectively may be somewhat lesser or greater in cross-sectional area than that of the entrance. It is important to provide a substantially unreduced cross-sectional area of flow at least during the time the plastic retains its granular condition to any substantial degree.

The drawings show two forms of torpedoes, both of which are shaped to form radially spread, peripherally interspaced and axially extending pathways through which the divided flows of plastic travel in the form of spread sub-divided flows of small cross sections and completely surrounded by heated surfaces.

In the first torpedo form the above action is achieved by forming each torpedo with a plurality of straight, radially projecting, axially extending and peripherally interspaced ribs 11. These ribs are proportioned to slidingly contact the walls of the cylinders 4 when both are cold in each instance and to define the previously described subdivided flow paths. These ribs 11, which form grooves between each pair of adjacent ribs, terminate adjacent to the cylinders' outlet ends 8 to form annular spaces 8a therein where the sub-divided plastic flows merge before entering the ducts 10. Proper purging continuously of the spaces 8a is effected by making one of the ribs 11a continuous to the base 12 of the torpedo in each instance, this rib smoothly flaring as at 11b to the extreme end of the cylinder in which the torpedo is located, so as to divide the flow into two circumferentially opposite directed sections with these sections leading to the duct 10 in each instance.

In the second form the ribs 11c correspond generally to the ribs 11, excepting that in this instance the ribs are in helical form or spiral around the torpedo from one end to the other. Correspondingly the grooves formed by the ribs are in helical or spiral form. In this case each sub-divided flow enters its space 8a with a rotary action so as to avoid the risk of the plastic remaining there unduly long. Consequently in this form there is no counterpart of the continuous rib 11a of the first form of torpedo.

In either instance the torpedoes, because they are internally heated, expand so as to form while hot a firm contact with the walls of the cylinders 4. Therefore, heat from the cartridge 7 is directly conducted through metallic paths to the body 1 where it surrounds the cylinders.

It can be seen from the drawings that the solid metal body 1 is bored to form the cylinders 4 side by side with their inlet ends 5 mutually adjacent and merging so as to open in common to the chamber 2. In fact, the chamber 2 results from the merging of the bores forming the various cylinders so that the rear portion of this chamber has a cross-sectional area greater than that of the entrance 3. The center lines of the cylinders intersect about at the entrance's axis. The entrance is formed in the body 1 at a location axially opposite to the inlet ends 5 of the various cylinders, and in axial alignment with the axis of the body 1, the latter having a generally conically exterior shape so as to accommodate the diverging cylinder bores. The discharge passage 9 is also aligned with the axis of the body 1 and with that of the entrance 3 and the ducts 10 are bored so as to extend from the cylinders' outlet ends 8 convergingly to join with the discharge passage 9.

At this point it is appropriate to note that this invention permits the practical production of a unit capable of being attached to a conventional injection molding machine to replace the latter's prior art heating cylinder. Thus the body 1 is formed with a rear flange 13 designed for fastening to the flange at the forward end of the shooting cylinder of an injection molding machine. This flange 13 surrounds the entrance 3 and it may be provided with a face adapted to seal with the face of the injection molding machine's flange. At the heater's discharge end the body 1 is formed with a face 14 to which the flange 15 of an injection molding nozzle 16, may be attached by screws 17. The piston area is small here and the necessary joint at this location may be rendered leak-proof by the use of a metal O-ring 18.

Some plastics have a tendency toward nozzle dribble between injection shots. Therefore, the body 1 has a bore 19 formed axially in from the face 14 and a normally closed valve 20 is located in this bore with a compression spring 21 biasing this valve closed. The nozzle 16 has an extension 21a extending inwardly from the O-ring 18 and formed with an internal conical seat. The valve has a conical tip 23 which fits this seat and behind this tip and in line with the ducts 10 the valve has a piston surface 24. When pressure is applied to discharge the plastic the latter forces the valve 20 open and when the pressure is static, which occurs when the piston 3a retracts and prior to another of its strokes forwardly, the spring 21 pushes the valve forwardly so that its tip seals the conical seat 22 to prevent dribbling at the nozzle.

The shape of the body 1 is such that its forward end provides a conical face 25 extending radially from the nozzle molding face 14 and the cylinders 4 are formed by bores extending inwardly from this face. Internally threaded counterbores 26 are formed at the outer ends of the bores forming the cylinders 4 and the torpedoes 6 have base flanges 6a fitted in these counterbores. To accommodate the heating cartridges 7 each torpedo has a bore 7a extending almost to its forward tip concentric with the axis of the torpedo. In addition, each torpedo has an axially offset bore 27 parallel to the bore containing the cartridge but extending only a short distance forwardly of the space 8a, and a thermocouple 28 is inserted in the bore 27 in any or all instances. Annular nuts 29 are screwed into each of the counterbores 26 on top of the torpedo bases 6a and a metal O-ring 30 is located beneath each of the torpedo bases 6a to seal against plastic leakage. The necessary conductors for the cartridges and thermocouples, generally indicated at 7b and 27a respectively, extend through the hollow nuts 29.

Attention is called to the fact that because each of the heating cylinders of this invention is individually small with respect to the shooting cylinder and plunger of the injection molding machine, there is a corresponding reduction in the troubles ordinarily experienced in connection with the sealing of the torpedo bases of the heating cylinders in a leakproof manner. Comparatively small tightening force need be applied to the nuts 29. It is to be noted that the O-rings 30 are mounted in smaller counterbores 26a so that when the torpedo bases 6a are forced solidly against the bottoms of the counterbores 26 the O-rings are not unduly compressed.

As shown in cross-section, the thermocouple bores 27 are located in radial alignment with the solid ribs 11a when torpedoes having straight ribs and grooves are used. In the case of the torpedo shape having spiral ribs and grooves this precaution is unnecessary because the thermocouple measures the average temperature of a number of ribs and grooves. In either case, the thermocouples are located adjacent to the rear ends of the torpedoes close to the outlet ends of the cylinders because with this invention the plastic is heated gradually and increasingly and attains its maximum temperature only as it very closely approaches the annular spaces 8a.

Furthermore, the torpedoes, being hotter than the body 1, expand more than the body and thus seat the various ribs solidly against the walls of the cylinders 4 while the heater is in operation, even though when cold the torpedoes form sliding fits with these cylinder walls so that the torpedoes may be installed or removed. The cylinder and torpedo contours are true cylinders although these parts may be tapered if desired, the latter being a more expensive construction and not considered to be necessary in most instances. It can be seen that the cylinder walls 4 are thoroughly heated and that all lost heat is in a radially outward direction mainly, the outside periphery of the body 1 being provided with thermal insulation 31 to reduce this loss.

At locations adjacent to the termination of the torpedo ribs the body 1 is provided with inwardly extending bores 32 which extend from its outside to locations close to the cylinder walls 4. Thermocouples 33 are located in these bores 32 with their electrical conductors 33a extending outwardly.

In addition to the details described so far, it is to be noted that each of the torpedoes has a relatively long projecting point 11d. These points are long enough to project backwardly into the chamber 2 and almost to the machine's shooting plunger 3a which is shown by the drawings in its fully advanced position. This provides an initial penetration of the granular plastic flow resulting when the plunger 3a is advanced for shooting. Likewise, it is to be noted that the converging relationship of the cylinders 4 naturally results in the body 1 having a streamline point 1a and sharp fins 1b, which in a streamlined manner confront the moving plastic stream. The point 1a may be machined slightly to provide it with the convexity illustrated, this shape not necessarily resulting simply from the boring operation which forms the cylinders 4.

In some instances, such as when warming up the heater from a cold shutdown condition, it may be desirable to put more heat into the body 1 than can be supplied by the heating cartridges 7. Therefore, the body 1 at locations circumferentially offset from cylinders 4 is formed with a series of bores 34 parallel to the cylinders 4, equi-distantly between these cylinders, and extending inwardly from the body's face 25 to locations opposite to the extreme ends of the torpedo tips 11d. Electrical resistance heating cartridges 35 are installed in these bores 34.

Incidentally, the electrical resistance heating cartridges shown in all instances, heat throughout most of their lengths as indicated by the zone legended "hot" in the drawings, the balance legended "cold" being unheated excepting by conduction from the heated portion.

This invention lends itself easily to good engineering practices both from the standpoint of construction and operation. Details not previously described include bleeding passages 19a and 19b for the bore 19, these being for the purpose of keeping the bore 19 clear as required to permit easy reciprocation of the valve 20. In case the advantages of this valve are not needed, it may be eliminated as shown by the modification, wherein the passage 9a corresponds to the passage 9. A wrap-around electric resistance heater 36 may be applied to the nozzle 16 for obvious reasons.

In operation, with the heater installed on an injection molding machine the heaters 7 and 35 are turned on to bring everything up to working temperature. Under actual working conditions it may be sufficient to provide only one of the torpedoes with a thermocouple 28 and to provide only one of the thermocouples 33 for the body, the other thermocouple bores being used as check points only. Under commercial conditions these thermocouples provide automatic control. In other words, when the thermocouple 33 senses the operating temperature it functions to terminate the current to the cartridges 35 heating the body 1. Correspondingly, the thermocouple 28 cuts off the current to the heating cartridges 7. When single thermocouples are used the thermocouple controls all of the cartridges for which it is intended in each instance.

With the heater up to temperature the plunger 3a is reciprocated to load the heater. The granular unplasticized plastic pushes easily into the four divided paths and through the sub-divided paths provided by the grooves between the ribs 11 or 11c, as the case may be. It is unnecessary to blast enough heat initially into the cold thermoplastic to start its plasticizing prior to its travel over the torpedo tips and through the grooves.

As the plastic travels forwardly it picks up heat in a gradual and progressive manner. Heat exchanges from the hot torpedo and its ribs and the cylinder walls presents relatively little difficulty because in each instance a stream of very small cross-section is receiving the heat. Maximum temperatures are attained only as the plastic closely approaches the annular spaces 8a at the torpedo bases. At this time the plastic is completely plasticized, and acts like a true liquid. It passes easier down the ducts 10, opens the valve 20 if this is used, and ejects through the nozzle 16.

The above operation is completed for each shot by the injection molding machine, it being understood that during shooting the tip of the nozzle 16 is pressed in sealing engagement with the sprue of the injection molding die. Under stable cycling of the machine the cartridges 35 may not operate at all, because of the very efficient heat exchange and heating conditions provided by this invention. Whenever the pressure is removed from the plastic the valve 20 closes assuming that this valve is provided.

This construction plainly provides for transmitting the great majority of the shooting plunger's pressure to the plasticized plastic passed by the nozzle 16. The cold plastic is not driven into a restricted passage so as to create great surface friction which must be subtracted from the plunger's pressure.

Although the illustrated heater is believed at this time to be the best mode of carrying out the invention, other constructions may be developed for the same purpose. It is not unusual for new things like this to be subject to change as manufacturing and operational experience is gained.

An example of one change is concerned with the fact that whenever a plastic flow is sub-divided and then brought together again by merging the flows after plasticizing of the plastic, there must be in effect a welding together of the sub-divided flows. This action may be seen frequently when a plastic of one color is used in an injection machine following another color. As the purging action progresses a specimen of the extruded stream when solidified and crosscut, shows the pattern of the separate flows. This indicates the need for a more thorough intermixing of the various plasticized flows for some purposes.

Therefore, in the second example of the machine although many of the parts correspond closely to those previously described and are therefore not described again, it can be seen that the corresponding body 1a is made to form a forwardly extending heating cylinder 37 having a bore 38 and a counterbore 39 in which the base 40 of an injection nozzle 41 is mounted by means of an annular nut 42. This nozzle presents a converging entrance 43 which is formed into a converging annular passageway by the conical tip of a spreader 44 which extends throughout the length of the cylinder 37 with its inner end having a mounting tail piece 45 positioned in a bore 46 formed in the body 1a somewhat in the fashion of the bore 19 previously described. The bottom of the bore 46 may be provided with a bleeding duct 47 leading to the outside of the heater and permitting the use of hydraulic pressure to force out the tail portion 45 from the bore 46 when removal is desired.

This cylinder 37 is provided with a series of wrap-around electric resistance heaters 48 and the nozzle 41 may also be provided with an external heater 49. The bore 50 shown in the cylinder 37 about midway with respect to its heated zone is used to receive a thermocouple which controls the heaters 48.

In this instance the ducts 10a correspond to the ducts 10. The plasticized plastic flows into the entrance end of the heating cylinder 37, the flow then proceeding through this cylinder. The temperature of the cylinder is maintained so as to keep the plastic in a fully plasticized condition so that it is fluid, and the length of the cylinder gives the plastic time for the previously sub-divided flows to merge more thoroughly together and become indistinguishable.

The cylinder 37 may be aptly called a homogenizing cylinder. The plastic enters this cylinder in a plasticized condition and the external heating used in this instance is required mainly to maintain the plasticized condition. The length of the cylinder 37 is related to its cross-sectional area so that the cylinder can contain a charge equal in volume to that required for an injection shot. Thus, for a 16 oz. shot, for instance, the cylinder should be made to contain 16 oz. of plastic.

I claim:

1. A plastic plasticizing heater including a body of an integral piece forming a plastic receiving chamber having an entrance through which unplasticized plastic may be charged under pressure and forming a discharge passage, means at said entrance for fastening the latter to the discharge end of an injection molding machine's shooting cylinder, means at said discharge passage for connecting an injection nozzle to this passage, said body having an outer face extending radially from the location of said discharge passage and a plurality of heating cylinders formed by bores extending inwardly from said face and having counterbores at their outer ends, said plurality of heating cylinders having inlet ends open to said chamber so that said plastic flows from the latter in the form of divided flows through said cylinders, said cylinders located side by side in diverging relation with their said inlet ends mutually adjacent and merging together so as to open in common to said chamber and the latter's said entrance axially opposite to said inlet ends, said heater including torpedoes positioned in said cylinders to spread said divided flows therein, said torpedoes having radial projections contacting the walls of said cylinders and having base flanges fitted in said counterbores and having bores formed axially therein and extending axially through their said base flanges to locations close to the torpedoes' forward ends for receiving electric resistance heating cartridges having conductors extending outwardly and releasable means for holding said base flanges forced against the bottoms of said counterbores and providing passages for said conductors, said cylinders having outlet ends, said discharge passage substantially aligned axially with said entrance and extending oppositely therefrom and ducts connecting said discharge passage with said outlet ends which extend from said cylinders' outlet ends convergingly to join with said discharge passage, so that said plasticized divided flows rejoin for discharge through said passage.

2. A plastic plasticizing heater including a body of an integral piece forming a plastic receiving chamber having an entrance through which unplasticized plastic may be charged under pressure and forming a discharge passage, means at said entrance for fastening the latter to the discharge end of an injection molding machine's shooting cylinder, means at said discharge passage for connecting an injection nozzle to this passage, said body having an outer face extending radially from the location of said discharge passage and a plurality of heating cylinders formed by bores extending inwardly from said face and having counterbores at their outer ends, said plurality of heating cylinders having inlet ends open to said chamber so that said plastic flows from the latter in the form of divided flows through said cylinders, said cylinders located side by side in diverging relation with their said inlet ends mutually adjacent and merging together so as to open in common to said chamber and the latter's said entrance is axially opposite to said inlet ends, said heater including torpedoes positioned in said cylinders to spread said divided flows therein, said torpedoes having radial projections contacting the walls of said cylinders and having base flanges fitted in said counterbores, metal O-rings located between said base flanges and the bottoms of said counterbores, and said torpedoes having bores formed axially therein and extending axially through their said base flanges to locations close to the torpedoes' forward ends for receiving electric resistance heating cartridges having conductors extending outwardly and releasable means for holding said base flanges forced against the bottoms of said counterbores and providing passages for said conductors, said cylinders having outlet ends, said discharge passage substantially aligned axially with said entrance and extending oppositely therefrom, and ducts connecting said discharge passage with said outlet ends which extend from said cylinders' outlet ends convergingly to join with said discharge passage, so that said pllasticized divided flows rejoin for discharge through said passage.

3. A plastic plasticizing heater including a body of an integral piece forming a plastic receiving chamber having an entrance through which unplasticized plastic may be charged under pressure and forming a discharge passage, means at said entrance for fastening the latter to the discharge end of an injection molding machine's shooting cylinder, means at said discharge passage for connecting an injection nozzle to this passage, said body having an outer face extending radially from the location of said discharge passage and a plurality of heating cylinders formed by bores extending inwardly from said face and having counterbores at their outer ends, said plurality of heating cylinders having inlet ends open to said chamber so that said plastic flows from the latter in the form of divided flows through said cylinders, said cylinders located side by side in diverging relation with their said inlet ends mutually adjacent and merging together so as to open in common to said chamber and the latter's said entrance is axially opposite to said inlet ends, said heater including torpedoes positioned in said cylinders to spread said divided flows therein, said torpedoes having radial projections contacting the walls of said cylinders and having base flanges fitted in said counterbores and having bores formed axially therein and extending axially through their said base flanges to locations close to the torpedoes' forward ends for receiving electric resistance heating cartridges having conductors extending outwardly and releasable means for holding said base flanges forced against the bottoms of said counterbores and providing passages for said conductors, said cylinders having outlet ends, means for measuring the temperatures of said torpedoes adjacent to said cylinder's outlet ends, said discharge passage substantially aligned axially with said entrance and extending oppositely therefrom, and ducts connecting said discharge passage with said outlet ends which extend from said cylinders' outlet ends convergingly to join with said discharge passage so that said plasticized divided flows rejoin for discharge through said passage.

4. A plastic plasticizing heater including a body forming a plastic receiving chamber having an entrance through which unplasticized plastic may be charged under pressure and forming a discharge passage, and a plurality of heating cylinders having inlet ends open to said chamber so that said plastic flows from the latter in the form of divided flows through said cylinders, said cylinders having outlet ends, ducts connecting the latter with said outlet ends, said heater including torpedoes positioned in said cylinders to spread said divided flows therein, a heating means located inside each of said torpedoes, said torpedoes having a plurality of radially projecting, axially extending and peripherally interspaced ribs contacting the walls of said cylinders to conduct heat thereto and defining therewith radially spread, peripherally interspaced and axially extending heated pathways through which said divided flows travel in the form of spread sub-divided flows for heating, all but one of said ribs terminating adjacent to said cylinders' outlet ends to form annular spaces therein wherein said sub-divided flows merge before entering said ducts connecting said outlet ends with said discharge passage, at least one of said ribs opposite to said duct for that torpedoes cylinder extending and smoothly flaring to the extreme end of that cylinder so as to divide into two circumferentially oppositely directed sections, said annular space formed by said terminated ribs with said sections leading to said duct, so that said plasticized divided flows rejoin for discharge through said passage.

References Cited in the file of this patent

UNITED STATES PATENTS

| | | |
|---|---|---|
| 2,233,558 | Shaw | Mar. 4, 1941 |
| 2,366,417 | MacMillin | Jan. 2, 1945 |
| 2,461,282 | Jobst | Feb. 8, 1949 |
| 2,480,838 | Caron | Sept. 6, 1949 |
| 2,482,243 | Burnham | Sept. 20, 1949 |
| 2,840,649 | Hupfield | Sept. 3, 1957 |
| 2,919,469 | Wheeler | Jan. 5, 1960 |
| 2,940,123 | Beck et al. | June 14, 1960 |
| 2,979,772 | Moslo | Apr. 18, 1961 |

FOREIGN PATENTS

| | | |
|---|---|---|
| 929,239 | France | July 7, 1947 |
| 890,571 | Germany | Sept. 21, 1953 |
| 1,042,226 | Germany | Oct. 30, 1958 |
| 702,317 | Great Britain | Jan. 13, 1954 |